(12) United States Patent
Lechman

(10) Patent No.: US 6,419,330 B1
(45) Date of Patent: *Jul. 16, 2002

(54) ENHANCED ACCESS WORKSTATION

(75) Inventor: John N. Lechman, Effingham, IL (US)

(73) Assignee: Nova Solutions, Inc., Effingham, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,059

(22) Filed: Jun. 7, 1999

(51) Int. Cl.[7] ............................ A47B 17/00; A47B 47/00
(52) U.S. Cl. .................... 312/194; 312/195; 312/257.1; 312/265.6
(58) Field of Search ................................. 312/194, 195, 312/196, 204, 223.3, 223.6, 265.2, 265.3, 265.5, 265.6, 257.1, 263, 236, 208.1, 111, 348.2, 293.3

(56) References Cited

U.S. PATENT DOCUMENTS

| | | | | |
|---|---|---|---|---|
| 1,135,975 A | * | 4/1915 | Browne | ...................... 312/195 |
| 2,387,506 A | * | 10/1945 | Freeman | ...................... 312/195 |
| 2,560,400 A | * | 7/1951 | Abrahamson | ................ 312/195 |
| 2,853,351 A | * | 9/1958 | Bassett | ........................ 312/194 |
| 3,125,387 A | * | 3/1964 | Abrahamson | ............... 312/195 |
| 3,360,321 A | * | 12/1967 | Novales | .................... 312/257.1 |
| 3,675,955 A | * | 7/1972 | Hajduk | ................ 312/257.1 X |
| 3,784,272 A | * | 1/1974 | Schreiber | ............. 312/257.1 X |
| 3,856,371 A | * | 12/1974 | Forsyth | ....................... 312/195 |
| 4,206,956 A | * | 6/1980 | Lydmar | .................. 312/111 X |
| 4,869,564 A | * | 9/1989 | Lechman | .................... 312/195 |
| 5,176,435 A | * | 1/1993 | Pipkens | ............... 312/265.6 X |
| 5,294,193 A | * | 3/1994 | Wegman et al. | ..... 312/208.1 X |
| 5,466,061 A | * | 11/1995 | Lautenschlager | ........ 312/348.2 |
| 5,505,554 A | * | 4/1996 | Lautenschlager et al. | .................... 312/348.2 X |
| 5,944,398 A | * | 8/1999 | Wu | .......................... 312/223.2 |

* cited by examiner

Primary Examiner—James O. Hansen
(74) Attorney, Agent, or Firm—Olson & Hierl, Ltd.

(57) ABSTRACT

A structure that provides for enhanced access to a chamber defined therein. The structure includes a top member and a support assembly for supporting the top member and together defining the chamber. The invention includes a panel removably connected to the structure and a securing device for removably securing the panel to the structure. The securing device is hidden from view when the panel is connected to the structure. Removing the panel provides for access to the chamber.

12 Claims, 2 Drawing Sheets

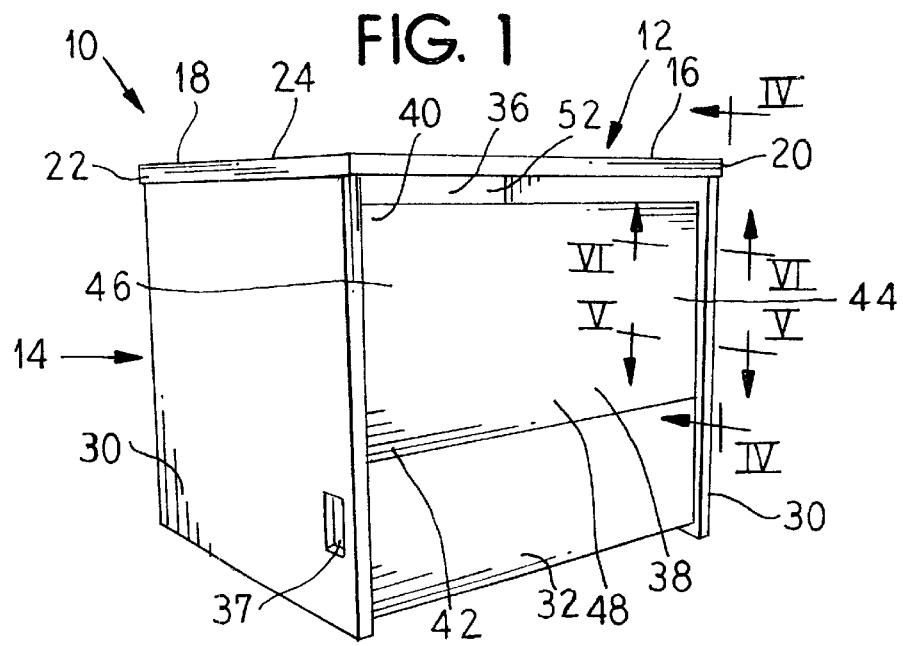
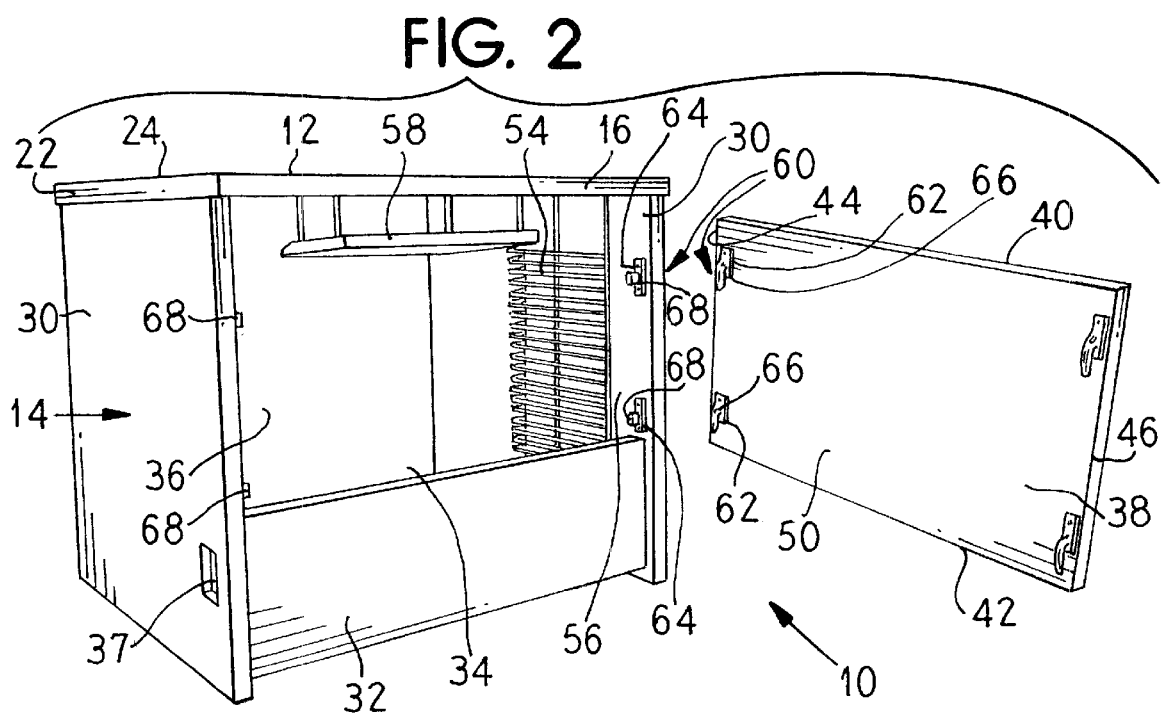

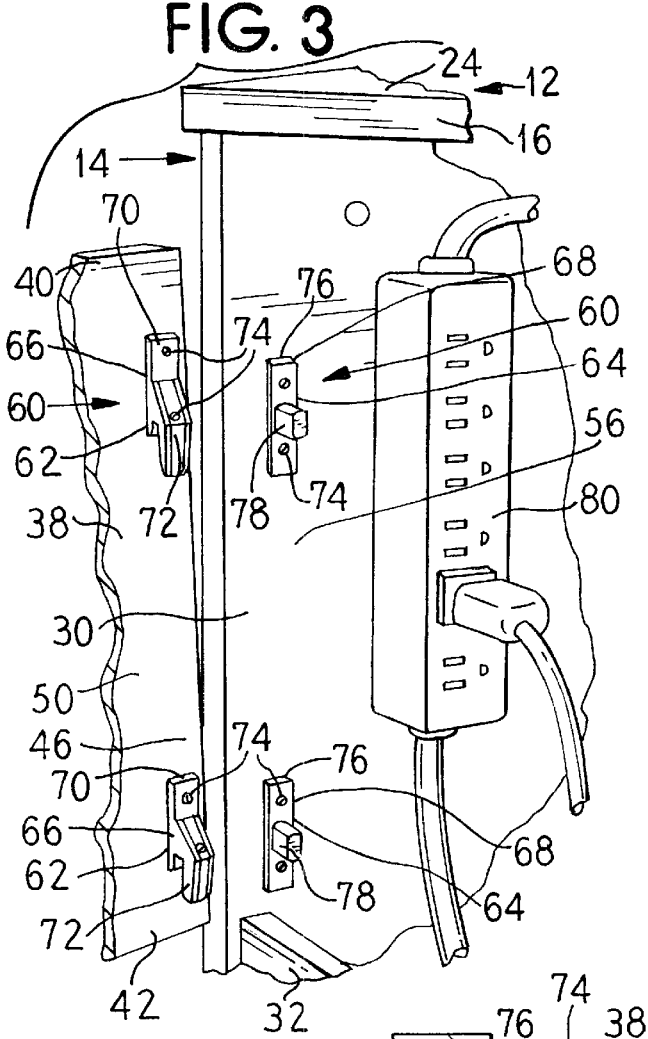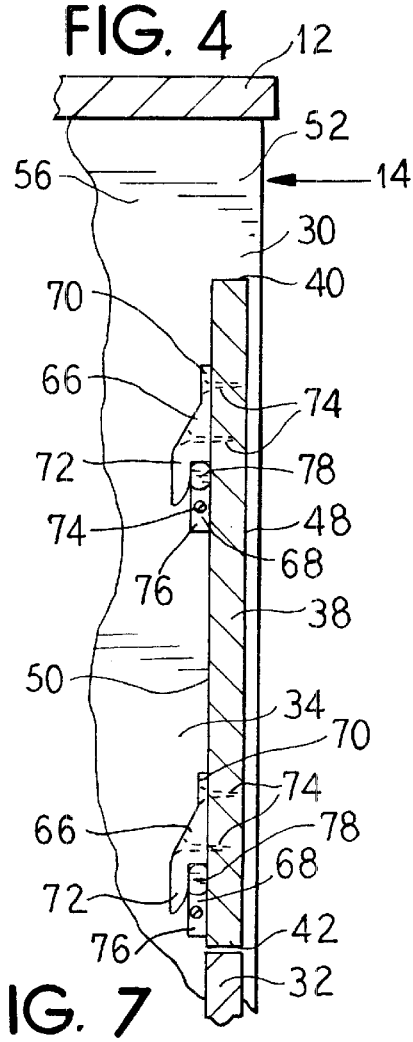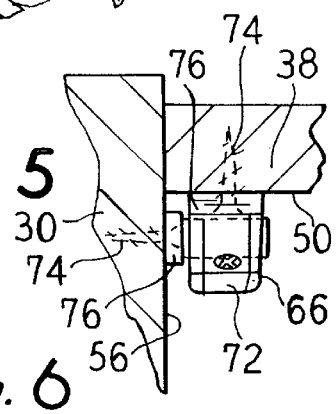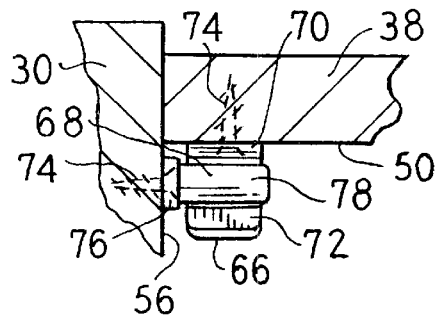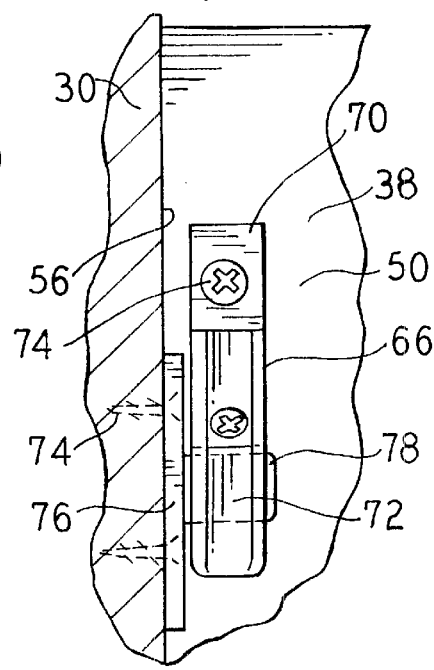

ENHANCED ACCESS WORKSTATION

TECHNICAL FIELD OF THE INVENTION

This invention relates to a structure and particularly to a desk structure with a removable panel that allows enhanced access thereto.

BACKGROUND OF THE INVENTION

Various workstation and desk structures have previously been developed for use with computer devices. In addition, various adjustable monitor support assemblies have been heretofore created for supporting a monitor at an inclined angle beneath a windowed aperture in the top member or working platform of such structures. The screen of the so-supported monitor is viewable through the windowed aperture by a user who is seated along one side of the structure. See, for example, commonly assigned Schairbaum U.S. Pat. No. Re. 34,266, Lechman U.S. Pat. No. 5,290,099, Wegman et al. U.S. Pat. No. 5,294,193 and Lechman U.S. Pat. No. 5,408,939.

Structures that have a top member with a windowed aperture and associated adjustable monitor support assembly are coming into wide-spread usage. The monitor commonly used is a conventional type of cathode ray tube display device (CRT) wherein a scanning focused election beam is moved in a systematic or raster pattern transversely relative to the beam path over phosphor screens configured as spherical segments. Such CRT devices generally require access to the back thereof to plug the device in or make adjustments.

Recently, interest has developed in structures wherein the inclined monitor is actually supported in the aperture (with the window removed) so that the monitor is partly below and partly above the top member.

To support and adjustably position a monitor in such an aperture, it is desirable to use the same type of adjustable monitor support apparatus that has previously been employed to support a monitor below a windowed aperture in a structure, such as indicated above. Since the aperture is usually located over a workstation kneehole chamber, the adjustable monitor support assembly should not interfere with the structure user's knees while the user is seated along one side of the structure. Unfortunately, however, the above type of support assembly generally orients the back of the monitor, and any associated wiring, away from the kneehole opening, making access thereto difficult. The user must crawl into the chamber, under the supported monitor, to access the back thereof.

There is thus a need for a structure, preferably a desk structure, for use with computer devices that provides for enhanced access thereto. There is further a need for a structure that allows for such access without otherwise detracting from the appearance of the structure as a whole or inhibiting the use thereof. The present invention fulfills that need.

SUMMARY OF THE INVENTION

The subject invention provides for enhanced access to a structure and specifically provides for enhanced access to computer devices supported in a kneehole chamber of such a structure. Moreover, the subject invention provides for such enhanced access without otherwise detracting from the appearance of the structure as a whole.

The present invention is comprised of a structure that includes a top member and a support assembly that supports the top member and together define the chamber. In one embodiment, a panel is removably connected to the desk structure by a securing device that removably secures the panel to the structure. The securing device is positioned behind the panel and thus is hidden from view when the panel is in place. Removing the panel provides for enhanced access to the chamber.

In one preferred embodiment, the panel is removable secured to the support assembly by the securing device comprised of two portions: a first portion operably connected to the panel, and a second portion operably connected to the support assembly in spaced relationship to the first portion. Preferably the first portion is comprised of at least two, but more specifically four, catch devices secured to the panel on opposite ends thereof. Additionally, the catch devices are in spaced relationship to at least a top edge of the panel. The catch devices are positioned so that they are not visible when the panel is secured to the structure. Furthermore, the catch devices are formed so that they do not inhibit use of the structure, that is prevent the user from positioning his or her knees in the chamber.

It is also contemplated that the second portion comprises at least two, but preferably four, upstanding members secured to the structure. Like the catch devices, the upstanding members are in spaced relationship to at least the top edge, in addition to being in spaced and numerical relationship to the catch devices. Moreover, the upstanding members are hidden from view when the panel is secured.

It should be noted that other embodiments of the present invention are contemplated. In one preferred embodiment, the structure is a desk structure, and more specifically a desk structure for supporting a computer device and/or display device in the chamber. The computer device and/or display device is further supported in the chamber by an adjustable support device that supports the computer device and/or display device in spaced relationship to the top member, and more specifically to a windowed aperture in the top member. Removing the panel provides for enhanced access to the adjustable support assembly, computer device and/or display device stored in the chamber.

Other features of the present invention are contemplated including at least one opening in one side of the structure. The opening is adapted for receiving the knees of a user seated at the structure and in communication with the chamber, whereby the panel is secured to the structure opposite the opening.

Other and further objects, aims, features, advantages, embodiments, alternatives and the like will be apparent to those skilled in the art from the present specification, accompanying drawings and the appended claims.

BRIEF DESCRIPTION OF THE DRAWINGS

In the drawings:

FIG. 1 is a perspective view of one embodiment of the present invention depicting the removable panel removably secured to the structure;

FIG. 2 is a perspective view of the present invention similar to FIG. 1 depicting the removable panel removed therefrom;

FIG. 3 is an enlarged fragmentary view of the structure and removable panel of FIGS. 1 and 2 depicting the securing device in an unengaged position;

FIG. 4 is vertical partial cross-sectional view of the structure and removable panel of FIG. 1 depicting two of the securing devices in an engaged position;

FIG. 5 is a horizontal partial cross-sectional view of the structure and removable panel of FIG. 1 depicting a top view of one of the securing devices in an engaged position;

FIG. 6 is horizontal partial cross-sectional view of t structure and removable panel of FIG. 1 depicting a bottom view of one of the securing devices in an engaged position; and FIG. 7 is a front view of one of the securing devices in an engaged position and depicting the structure partially in cross-section.

DESCRIPTION OF THE PREFERRED EMBODIMENT

While this invention can be embodied in many different forms, there are shown in the drawings and described in detail preferred embodiments of the invention. The present disclosure is an exemplification of the principles of the invention and is not intended to limit the invention to the embodiments illustrated.

Referring to FIG. 1 of the drawings, one embodiment of a structure, preferably a desk structure generally designated 10, is shown. Structure 10 is depicted having a generally horizontally extending top member 12 and a support assembly 14 for supporting top member 12 in spaced relationship to an underlying surface, generally a floor. Top member 12 is shown having front and back edges 16 and 18 and opposing side edges 20 and 22.

As provided above, top member 12 is supported by support assembly 14 in spaced relationship to an underlying surface (not shown) and includes a surface 24. In one preferred embodiment, it is contemplated that surface 24 includes an aperture defined therein in spaced relationship to the front, back and side edges 16, 18, 20 and 22.

It is preferred that the aperture include a window set therein for transmission of light images similar to that described in commonly assigned Lechman U.S. Pat. No. 5,662,395. It is contemplated that the window is made of glass, plastic or any other generally transparent material. Furthermore, it is contemplated that the window include one or more layers of antireflective coating on at least one face for reducing the reflection of incident light.

As depicted, support assembly 14 includes a pair of laterally spaced vertical side walls 30 and a lower support panel 32. Laterally spaced vertical side walls 30 are preferably joined to and support the top member 12 in spaced relationship to the underlaying surface, while support panel 32 is joined to and supports side walls 30. Together, sides walls 30 and support panel 32 define a kneehole chamber 34 (best seen in FIG. 2). In one preferred embodiment, chamber 34 is configured to support a computer device, including a display device or monitor, CPU and/or keyboard (not shown), therein.

While side walls 30 are depicted, structure 10, including support assembly 14, can be variously configured and constructed without departing from the scope of the present invention. It is contemplated that support assembly 14 could be comprised of support legs, drawer sets, file drawer sets, pedestals, or any combination thereof for supporting the top member 12 in spaced relationship to the underlying surface. Moreover, it is contemplated that structure 10 could be a separate unit as shown or part of a larger assembly, i.e., a modular furniture system. Moreover, the shape of structure 10 need not necessarily be rectangular, any shape is contemplated.

Side walls 30 further define at least one kneehole opening 36 therebetween in one side of the structure 10 (best seen in FIG. 2) generally, although not necessarily, in the side of structure 10 opposite the support panel 32. Kneehole opening 36 is in communication with chamber 34, whereby kneehole opening 36 is adapted for receiving the knees of a user seated at the structure 10. At least one other opening, access 37 is contemplated in side walls 30, and in communication with chamber 34, to provide a means for cables to be run therein.

The present invention further includes a device for providing enhanced access to the chamber 34 and any device stored or supported therein. In one preferred embodiment, structure 10 includes a panel 38 removably connected to the structure 10, but ideally to the support structure 14. In the embodiment shown, panel 38 is positioned on structure 10 in spaced relationship to top member 12 and support member 32.

As shown, panel 38 includes opposing top and bottom edges 40 and 42 and opposing first and second side edges 44 and 46. Additionally, panel 38 includes first and second surfaces 48 and 50, where second surface 50 faces inwards towards chamber 34. Panel 38 further defines a gripping aperture 52 between top edge 40 and the top member 12, providing a means for a user to insert his hand into chamber 34 and remove the panel 38.

Turning now to FIG. 2, the structure 10 is shown in perspective with the panel 38 removed. An adjustable support device 54 is depicted joined to an inner surface 56 of side walls 30 by screws, bolts, glue or the like. The adjustable support device 54, in this embodiment, is comprised of a pair of opposing spaced rungs and shelf (not shown) that support a display device or monitor in spaced relationship to the top member 12 for viewing through a window therein similar to that depicted in commonly assigned Lechman U.S. Pat. No. 5,290,009, Lechman et al. U.S. Pat. No. 5,125,727 and Wegman et al. U.S. Pat. No. 5,294,193. Additionally, it is contemplated that structure 10 includes a keyboard support device 58 for movably supporting a keyboard in chamber 34.

A securing device 60 is further contemplated for removably securing panel 38 to structure 10, preferably to support assembly 14. As shown in FIG. 2, securing device 60 is comprised of a first portion 62 operably connected to panel 38 and a second portion 64 operably connected to the structure 10, preferably to support assembly 14, in spaced relationship to the first portion 62.

FIG. 2 reveals that the first portion 62 is comprised of at least two but preferably four catch devices 66 secured to panel 38 on opposite ends thereof. As shown, the catch devices 66 are secured to second surface 50 in spaced relationship to at least the top edge 40 of panel 38, preferably on opposing corners thereof, and thus hidden from view when panel 38 is secured to the structure 10. In one preferred embodiment, the catch devices 66 are in spaced relationship to the top, bottom and first and second side edges 40, 42, 44 and 46. Additionally, the second portion 64 is comprised of at least two but preferably four upstanding members 68.

FIG. 2 further reveals that upstanding members 68 are secured to the structure 10, preferably to the inner surface 56 of the side walls 30 in spaced and numerical relationship to the catch devices 66. Like catch devices 66, upstanding members 68 are hidden from view when panel 38 is secured to structure 10. Catch devices 66 are removably connected to the upstanding members 68 (best seen in FIGS. 4–7) to removably secure panel 38 to the structure 10. While catch devices 66 and upstanding members 68 are shown, other securing devices are contemplated including magnets, hook and eye devices, twist locks, shafts and slots, telescoping hinges and the like suitable for removably securing panel 38 to structure 10 without otherwise detracting from its appearance or inhibiting use.

Securing device 60 is depicted in greater detail in FIGS. 3–7. FIG. 3 depicts the securing device 60 in an unengaged position. Catch device 66 is shown as a single unit comprised of a base portion 70 and an upstanding engaging portion 72, where base portion 70 is secured to second surface 50 by screws 74, although other means are contemplated including glue and the like. Engaging portion 72 is integral with base portion 70 and formed to removably engage the upstanding members 68 in a "hook-like" fashion. Additionally, engaging portion 72 is formed in spaced relationship to base portion 70 so that it does not extensively intrude into chamber 34, thereby inhibiting the use of the structure 10.

Upstanding member 68 is likewise depicted as a single unit comprised of two portions, a base portion 76 and a tab portion 78. Like base portion 70, base portion 76 is secured to inner surface 56 by screws 74 or the like. Tab portion 78 projects from base portion 76 into chamber 34 so that engaging portion 72 can rest thereon in a "hook-like" fashion when panel 38 engages the structure 10. Like engaging portion 72, tab portion 78 is formed in spaced relationship to base portion 76 so that it does not inhibit use of the structure 10 in that it only projects into chamber 34 sufficiently to allow engagement thereof. FIG. 3 further details a power strip 80 secured to inner surface 56. While not necessary, power strip 80 is useful for providing power to the various devices supported in chamber 34.

Turning now to FIGS. 4–7 greater detail is provided on the method in which the catch devices 66 and upstanding members 68 removably interact so that panel 38 is removably secured to the structure 10. FIG. 4 reveals that the catch devices 66 and upstanding members 68 are in numerical and spaced relationship. Engaging portion 72 engages tab portion 78 so that it rests thereon in a hook-like manner as shown in FIGS. 5–7.

In use, the computer devices and/or monitors are adjustable supported in chamber 34, in one preferred embodiment using support device 54. The user inserts a hand through gripping aperture 52 into chamber 34, gripping the top edge 40 of panel 38. The user then lifts up and out on panel 38 so the engaging portions 72 are lifted off and out of tab portions 78, thus removing the panel 38 from the structure 10 as shown in FIGS. 2 and 3. The user can now access the computer device, monitor, support device 54, power strip 80 or any other device in chamber 34.

FIG. 5 is a horizontal partial cross-sectional view of the structure 10 and panel 38 depicting a top view of one of the securing devices 60 in an engaged position. FIG. 6 is horizontal partial cross-sectional view of the structure 10 and panel 38 depicting a bottom view of one of the securing devices 60 in an engaged position. Finally, FIG. 7 is a front view of one of the securing devices 60 in an engaged position, depicting the structure 10 partially in cross-section.

To secure the panel 38 to the structure 10, the above process is reversed. Panel 38 is lined up with support panel 32 and lifted up and in so that engaging portion 72 engages tab portion 78. The panel 38 is then lowered so that engaging portion 72 rests on tab portion 78.

It will be readily apparent from the foregoing detailed description of the invention and from the illustrations thereof, that numerous variations and modifications may be effected without departing from the true spirit of the novel concepts or principles of this invention.

I claim:

1. A structure comprising a top member and a support assembly for supporting said top member, said top member and said support assembly together defining a chamber, and said top member and said support assembly also together defining an opening in one side of said structure, said opening being in communication with said chamber;

a panel removably connected to said structure at said opening, and said panel being removable from said opening without disturbing said support assembly, thereby to provide access to said chamber; and a securing device removably connecting said panel to said structure, whereby said securing device is hidden from view when said panel is connected to said structure;

said securing device comprising at least two catch members, and each catch member comprises both a first portion and a second portion, one of which includes hook means that disengageably engages with connection means of the other, and each said first portion is operably and fixedly connected to a different edge portion of said panel, and each said second portion is operably and fixedly connected to a different portion of said support assembly, including connection means therefor; and the relationship between said top member, said support assembly, said panel, and said first and said second portions of each said catch member being such that, for each said catch member, said first and said second portions are disengageably engageable relative to one another when said panel is located in a predetermined position relative to said opening;

whereby said panel is engageable with, and disengeable from, said support assembly without any alteration of any one of said top member, said support assembly, said panel, and said catch members.

2. The structure of claim 1 wherein said first portions are each connected to said panel along opposed side edge portions thereof, and wherein said panel, when so engaged with said support assembly, has upper edge portions that are generally vertically and downwardly spaced from adjacent portions of said top member.

3. A desk structure comprising a top member having a working surface that includes a front side and an opposed back side;

a support assembly for supporting said top member in vertically spaced relationship to an underlying support surface, said support assembly including at least two vertically extending, laterally spaced support members for said top member, each one of said two support members including a portion that is located adjacent to said back side;

said support assembly and said top member cooperating together to define therewithin a kneehole chamber that has a front entrance which is located beneath said front side and has a rear entrance which is located beneath said back side and between said two support members;

a panel member that has opposite end portions and is extendable laterally across portions of said rear entrance with each of said opposite end portions being adjacent to a different one of said two support member portions;

at least two engaging devices, each said engaging device for associating each of said opposite end portions with a different one of said two support member portions, each said engaging device comprising a first component that comprises a post member that upstands from a post base and a second component that comprises a hook member that projects from a hook base, and wherein said hook member is matingly disengageably engageable with said post member, and including fastening means for each one of said bases;

said base of one of said first and said second components of each said engaging device being fastened by said fastening means to a different one of each of said opposite end portions, and said base of the other one of said first and said second components of each said engaging device being fastened by said fastening means to a different one of said two support member portions;

the interrelationship between said two support members, said panel member, and said engaging devices being such that when said panel member is so extended across said rear entrance portions, each said first component is disengageably engageable with a respective different second component, and is disengageable therefrom without effect upon support of said top member by said support assembly, whereby said panel member is removably supported laterally across said rear entrance portions, and when said panel member is removed from said rear entrance portions, and each of said first components is disengaged from a respective different second component, said removal and said disengagement is without effect upon support of said top member by said support assembly, and said kneehole chamber is accessible from said rear entrance.

4. The desk structure of claim 3 wherein, when said panel member is so supported across said rear entrance portions, said engaging devices are not externally viewable relative to said desk structure.

5. The desk structure of claim 3 where, in each of said second components, said hook is oriented so as to be downwardly open whereby said panel member is removably disengaged from said two support member portions by raising said panel member, and said opposite end portions of said panel member are each removably engaged with a different one of said two support member portions by lowering said panel member with each of said hooks of said second components being vertically aligned with said post member of each said first component.

6. The desk structure of claim 3 which incorporates four pairs of said engaging devices, and wherein one said base of each of two of said engaging devices is so fastened to one of each of said opposite end portions while the other one of said bases of each of the other two of said engaging devices is so fastened to a different one of said two support member portions, whereby said panel member is so removably supported laterally across said rear entrance portions by two said engaging devices at each one of said opposite end portions.

7. The desk structure of claim 6 wherein, relative to each of said opposite end portions, one of said engaging devices is located above the other, and in each of said second components, said hook is oriented so as to be downwardly open, and, when said panel member is so removably engaged, said panel member hangs from said support member portions.

8. The desk structure of claim 6 wherein only said hook bases of each of said engaging devices is so fastened to each of said opposite end portions and only said post bases of each of said engaging devices so fastened to each of said two support member portions.

9. The desk structure of claim 6 wherein, when said panel member is so supported across said rear entrance portions, said engaging devices are not externally viewable relative to said desk structure.

10. A desk structure comprising:

a top member and a support assembly for supporting said top member, said top member and said support assembly together defining a chamber; and said top member and said support assembly also together defining an opening in one side of said desk structure, said opening being in communication with said chamber;

a panel removably connected to said desk structure at said opening, said panel being removable from said opening without disturbing said support assembly, thereby to provide access to said chamber, whereby said opening is adapted for receiving the knees of a user seated at said desk structure; and a securing device for removably connecting said panel to said desk structure at said opening, whereby said securing device is hidden from view when said panel is so connected to said desk structure, said securing device extending between portions of said panel and portion of said support assembly when said panel is so removably connected to said desk structure at said opening;

said securing device comprising four catch members, and each said catch member comprises both a first portion and a second portion wherein said second portion is disengageably engageable with said first portion, and each said first portion is operably connected to a different side edge portion of said panel, and each said second portion is operably connected to a different portion of said support assembly, and the relationship between said first and said second portions of each said catch member is such that, for each said catch member, said second portion is disengageably engageable with said first portion when said panel is located in a predetermined proximate position relative to said opening whereby said panel is engageable with, and disengageable from, said support assembly.

11. The desk structure of claim 10 wherein, in said securing device, said first portion of each of two of said catch members is located in spaced relationship to the other along a common side edge portion of said panel, and said first portion of each of the remaining two of said catch members is located in spaced relationship to the other along a common opposite side edge portion of said panel, and said second portions of said catch members are located so that two of said second portions are positioned in generally vertically spaced relationship relative to each other on each of two different respective spaced portions of said support assembly, said respective spaced portions of said support assembly being located so that each one thereof is adjacent to a different one of said respective opposite side edge portions of said panel when said panel is located in said predetermined proximate position.

12. The desk structure of claim 11 wherein, when said panel is so engaged with said support structure, upper edge portions of said panel are generally vertically and downwardly spaced from adjacent portions of said top member.

* * * * *